United States Patent
Bohaychuk

(10) Patent No.: US 8,371,333 B2
(45) Date of Patent: Feb. 12, 2013

(54) CAGE VALVE WITH EROSION CONTROL

(75) Inventor: Larry J. Bohaychuk, Ardrossan (CA)

(73) Assignee: Master Flo Valve Inc., Edmonton (CA)

( * ) Notice: Subject to any disclaimer, the term of this patent is extended or adjusted under 35 U.S.C. 154(b) by 775 days.

(21) Appl. No.: 12/199,078

(22) Filed: Aug. 27, 2008

(65) Prior Publication Data

US 2010/0051849 A1  Mar. 4, 2010

(51) Int. Cl.
*F16K 1/36* (2006.01)
(52) U.S. Cl. .................. 137/625.33; 251/118
(58) Field of Classification Search ............ 137/625.33; 251/118
See application file for complete search history.

(56) References Cited

U.S. PATENT DOCUMENTS

| | | | |
|---|---|---|---|
| 4,376,448 A * | 3/1983 | Skough | 137/329.02 |
| 4,540,022 A | 9/1985 | Cove | |
| 4,679,592 A * | 7/1987 | Lamb | 137/625.33 |
| 4,860,993 A * | 8/1989 | Goode | 251/127 |
| 5,086,808 A * | 2/1992 | Pettus | 137/625.3 |
| 5,431,188 A | 7/1995 | Cove | |
| 6,105,614 A | 8/2000 | Bohaychuk et al. | |
| 6,782,949 B2 | 8/2004 | Cove et al. | |
| 7,426,938 B2 | 9/2008 | Bohaychuk et al. | |
| 2003/0024580 A1 | 2/2003 | Bohaychuk | |

FOREIGN PATENT DOCUMENTS

| | | |
|---|---|---|
| GB | 2424690 | 10/2006 |
| GB | 2430448 | 3/2007 |

* cited by examiner

*Primary Examiner* — John Fox
(74) *Attorney, Agent, or Firm* — Lathrop & Gage LLP

(57) ABSTRACT

A cage valve for reduced erosion at the outlet bore. The valve is of the type having flow trim arranged transverse to the inlet bore and aligned with the outlet bore, the flow trim including a stationary tubular cage and an external cylindrical flow collar slidable along the side wall of the cage to cover or uncover one or more pairs of main flow ports in the cage side wall. The external flow collar is located for movement between a fully closed position wherein each of the main flow ports is fully covered by the external flow collar and a fully open position wherein each of the main flow ports remains partially covered by the external flow collar such that fluid flow from the inlet through each of the main flow ports is directed angularly into the external flow collar, away from the outlet bore, to reduce erosion at the outlet bore.

14 Claims, 2 Drawing Sheets

CAGE VALVE WITH EROSION CONTROL

BACKGROUND OF THE INVENTION

This invention relates to a cage valve for erosion control at the outlet, and to a method of reducing erosion control at the outlet of a cage valve.

A choke valve is a throttling device. It is commonly used as part of an oil or gas field wellhead. It functions to reduce the pressure of the fluid flowing through the valve. Choke valves are placed on the production "tree" of an oil or gas wellhead assembly to control the flow of produced fluid from a reservoir into the production flow line. They are used on wellheads located on land and offshore, as well as on wellheads located beneath the surface of the ocean.

Choke valves common to oil and gas field use are generally described in U.S. Pat. No. 4,540,022, issued Sep. 10, 1985, to Cove and U.S. Pat. No. 5,431,188, issued Jul. 11, 1995 to Cove. Both patents are commonly owned by Master Flo Valve, Inc., the assignee of the present application.

In general, choke valves involve:
a valve body having an axial bore, a body inlet (typically oriented as a side outlet to the axial bore) and a body outlet (typically referred to as an end outlet, aligned with the axial bore);
a "flow trim" mounted in the bore between inlet and outlet, for throttling the fluid flow moving through the body; and
means such as a stem and bonnet assembly for actuating the flow trim to open and close the choke valve, and for closing the upper end of the axial bore remote from the outlet.

There are four main types of flow trim commonly used in commercial chokes. Each flow trim involves a port-defining member forming one or more flow ports, a movable member for throttling the flow ports, and seal means for implementing a total shut-off. These four types of flow trim can be characterized as follows:

(1) a needle-and-seat flow trim comprising a tapered annular seat fixed in the valve body and a movable tapered internal plug for throttling and sealing in conjunction with the seat surface;

(2) a cage-with-internal-plug flow trim, comprising a tubular, cylindrical cage, fixed in the valve body and having ports in its side wall, and a plug movable axially through the bore of the cage to open or close the ports. Shut-off is generally accomplished with a taper on the leading edge of the plug, which seats on a taper carried by the cage or body downstream of the ports;

(3) a multiple-port-disc flow trim, having a fixed ported disc mounted in the valve body and a rotatable ported disc, contiguous therewith, that can be turned to cause the two sets of ports to move into or out of register, for throttling and shut-off; and (4) a cage-with-external-sleeve flow trim, comprising a tubular cylindrical cage having ports in its side wall and a hollow cylindrical sleeve (external flow collar) that slides axially over the cage to open and close the ports. The shut-off is accomplished with the leading edge of the sleeve contacting an annular seat carried by the valve body or cage.

In each of the above, the flow trim is positioned within the choke valve at the intersection of the choke valve's inlet and outlet. In most of the valves, the flow trim includes a stationary tubular cylinder referred to as a "cage", positioned transverse to the inlet and having its bore axially aligned with the outlet. The cage has restrictive flow ports extending through its sidewall. Fluid enters the cage from the choke valve inlet, passes through the flow ports and changes direction to leave the cage bore through the valve outlet.

The present invention is directed to the cage-with-external-sleeve flow trim type valve. External sleeve flow trim designs for choke valves are generally described in the prior art, see for instance U.S. Pat. No. 4,540,022, issued Sep. 10, 1985, to Cove et al., and U.S. Pat. No. 6,105,614, issued Aug. 22, 2000 to Bohaychuk et al., and US 2006/0163517 published Jul. 27, 2006 to Bohaychuk et al. A choke valve including an external sleeve flow trim in sub-sea applications is shown in U.S. Pat. No. 6,782,949 to Cove et al. These patents describe the beneficial characteristics of the external sleeve (also termed flow collar) design in erosion control, valve outlet erosion protection, seating integrity, and fluid energy control features.

A typical prior art choke valve (cage valve) is shown in FIG. 1. The prior art flow trim typically includes an external tubular throttling sleeve (flow collar) that slides over the cage. The sleeve acts to reduce or increase the area of the flow ports. An actuator, such as a threaded stem assembly, is provided to bias the sleeve back and forth along the cage. The rate that fluid passes through the flow trim is dependent on the relative position of the sleeve on the cage and the amount of port area that is revealed by the sleeve.

Maintenance on the deep sub-sea wellhead assemblies cannot be performed manually. An unmanned, remotely operated vehicle, referred to as an "ROV", is used to approach the wellhead and carry out maintenance functions. To aid in servicing sub-sea choke valves, such choke valves have their internal components, including the flow trim, assembled into a modular sub-assembly. The sub-assembly is referred to as an "insert assembly" and is inserted into the choke valve body and clamped into position.

The choke valve "sees" or experiences relatively high and relatively low fluid pressures. More particularly, the fluid flowing in through the valve body inlet from the well has a high pressure. When the fluid passes through the restrictive cage flow ports it undergoes a considerable pressure drop. Thus, the fluid passing through the cage bore and the valve body outlet is at a lower pressure than that in the body inlet.

SUMMARY OF THE INVENTION

According to one aspect of the invention, there is provided a valve having a fluid flow path extending therethrough which is to be restricted or closed, comprising:
a hollow valve body assembly having an inlet bore and an outlet bore substantially at right angles and a main bore which is an extension of the outlet bore and which communicates with the inlet bore;
a flow trim positioned in the main bore, the flow trim comprising a stationary tubular cage and an external flow collar slidable along the side wall of the cage, the cage side wall forming an internal bore aligned with the outlet bore and at least a pair of diametrically opposed main flow ports, whereby fluid enters the valve through the inlet bore, passes through the main flow ports at reduced pressure and continues through the outlet bore;
a bonnet disengagably connected with, and closing, an upper end of the valve body;
a stem for biasing the external flow collar over the main flow ports; and
the external flow collar being located within the main bore for movement between a fully closed position wherein each of the main flow ports is fully covered by the external flow collar and a fully open position wherein each of the main flow ports remains partially covered by the external flow collar such that fluid flow from the inlet bore through the main flow ports is directed angularly into the external flow collar away from the outlet bore to reduce erosion at the outlet bore.

The invention extends to multiple embodiments to limit the movement of the external flow collar such that each of the main flow ports remains partially covered by the flow collar in the fully open position. Exemplary embodiments include one or more of the following arrangements:

i) locating or sizing each of the main flow ports on the cage such that it remains partially covered by the flow collar in the fully open position;

ii) locating the cage relative to the external flow collar such that each of the main flow ports remains partially covered in the fully open position;

iii) locating or sizing the external flow collar relative to the cage and the main flow ports such that each of the main flow ports remains partially covered in the fully open position; and iv) including a stop mechanism to limit the travel of the stem and the external flow collar such that each of the main flow ports remains partially covered in the fully open position.

According to another aspect of the invention, the valve is adapted to have retrievable valve internals for sub-sea applications. As such the valve is preferably arranged as follows:

the inlet bore and the outlet bore are arranged in a T-shape to provide a body side inlet, a body outlet and an insert chamber at the intersection of the body side inlet and the body outlet; and the tubular sleeve and the flow trim are arranged as a removable insert assembly positioned in the insert chamber, the insert assembly comprising:

i. a tubular cartridge having a side wall forming an internal bore and at least one side port communicating with the body side inlet, whereby fluid enters through the at least one side port from the body side inlet;

ii. the flow trim positioned in the cartridge internal bore, the flow trim comprising the tubular cage aligned with the body outlet, and the external flow collar slidable along the side wall of the cage, the cage side wall forming the pair of diametrically opposed main flow ports located to overlap the intersection of the axes of the body side inlet and the body outlet, and aligned with the at least one side port of the tubular cartridge to communicate directly with the side port, whereby fluid from the body side inlet may enter the cage bore at reduced pressure and pass through the body outlet;

iii. the bonnet disengagably connected with, and closing, the upper end of the tubular cartridge and the body;

iv. the stem to bias the flow collar over the main flow ports; and v. the external flow collar being located within the tubular cartridge for movement between a fully closed position wherein the main flow ports are fully covered by the external sleeve and a fully open position wherein each of the main flow ports remain partially covered by the external flow collar such that fluid flow from the body side inlet through the main flow ports is directed angularly into the external flow collar away from the body outlet to reduce erosion at the outlet bore.

The invention also broadly extends to components of the valve of the present invention, including the flow trim components and the retrievable valve components adapted as a removable insert assembly for sub-sea applications.

The invention also extends to a method of reducing erosion at the valve body outlet of a valve of a cage-with-external-sleeve flow trim design.

DETAILED DESCRIPTION OF THE INVENTION

As used herein and in the claims, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

Figure 1:
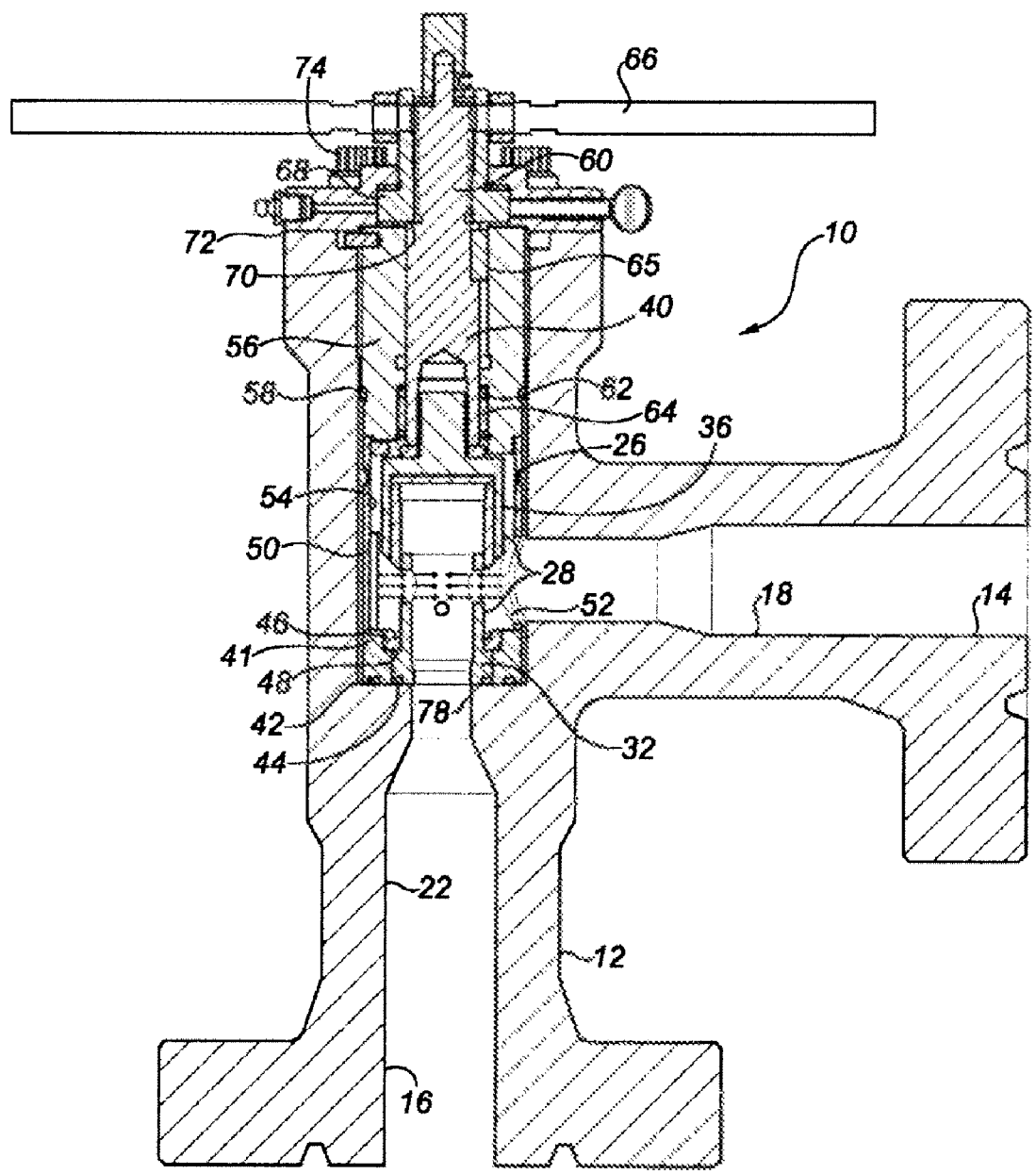
FIG. 1 is a side sectional view of a choke valve of the prior art showing an external flow collar of the flow trim in the fully open position wherein the main flow ports are fully uncovered such that fluid flow from the inlet through the diametrically opposed main flow ports is directed parallel to the inlet axis.
Figure 2:
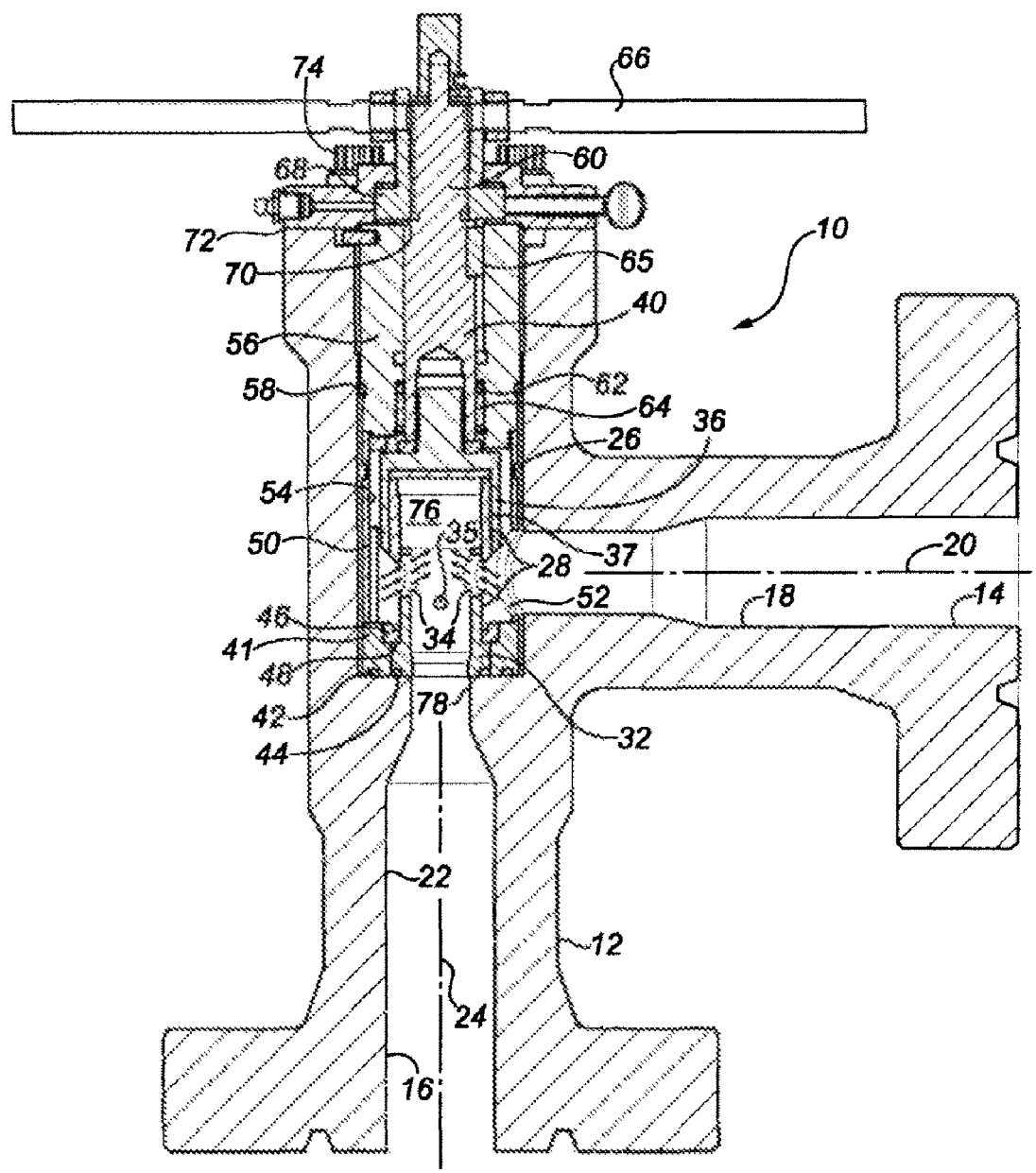
FIG. 2 is a side sectional view of the choke valve of the present invention, in which the external flow collar of the flow trim in the fully open position partially covers each of the main flow ports such that fluid flow from the inlet through the diametrically opposed main flow ports is directed angularly into the flow collar away from the outlet to reduce erosion at the outlet.

The cage valve of the present invention is illustrated in FIG. 2 to be a choke valve of the internal cage, external sleeve or flow collar design. To best contrast the invention, a prior art valve similar to that of present invention, but without the improved flow trim components to direct fluid flow away from the outlet in the fully open position, is shown in FIG. 1, with like elements being similarly numbered in both Figures.

Turning to FIG. 2, the choke valve of the invention is generally shown at 10 to include a hollow valve body 12, body side inlet 14 and body outlet 16. The hollow valve body 12 forms a bore which extends therethrough providing side inlet bore 18 having an inlet bore axis 20 (centre axis), a bottom outlet bore 22 having outlet bore axis 24 (centre axis). The bores 18, 22 intersect at right angles (i.e., are generally T-shaped), forming a main bore 26 at the intersection. The main bore 26 is an extension of the outlet bore 22, but also communicates with the inlet bore 18.

Flow trim components 28 are shown to be located in the main bore 26, including a stationary cage 32 which is tubular and substantially open-ended, and an external throttling cylindrical sleeve or flow collar 36 adapted to slide along the outer side wall of the upstream end of the cage 32. The flow collar 36 is closed at its upper end (upstream end) and typically includes an inner liner 37 formed of hard, erosion resistant material. The cage 32 has a side wall which forms an internal bore that communicates and is substantially aligned with the outlet bore 22. The side wall of the cage 32 also forms at least a pair of diametrically opposed main flow ports 34, and preferably at least a pair of diametrically opposed smaller, secondary flow ports 35. The secondary flow ports 35 have a smaller diameter than that of the main flow ports 34, and are positioned with their axis (i.e., an axis through the midpoint of the ports) which is rotated or offset by 90° from the axis of the main flow ports 34. The secondary ports 35 are positioned closer to the body outlet 16 than are the main flow ports 34. The main flow ports 34, being larger in diameter, accommodate a majority (i.e., more than 50%) of the fluid flow from the inlet 14. Preferably, the main flow ports 34 are arranged as diametrically opposed pairs, such as 1, 2 or 3 pairs. The main flow ports 34 are circumferentially spaced and are circumferentially aligned on the cage 32 (i.e., their midpoints are equally spaced in a circle around the circumference of or the cage). Most preferably, there is only one pair of main flow ports 34, and one pair of secondary flow ports 35 (as shown in FIG. 2), with port diameters such that the main flow ports accommodate greater than about 80% of the fluid flow from the inlet 14, such as about 85%, with the secondary flow ports 35 handling the rest.

The flow collar 36 is connected to a stem/bonnet assembly 40 for closing the upper end of the valve body 12 (i.e., the end opposite the outlet 16) and for advancing or withdrawing the flow collar 36 to slide across the ports 34, 35 to close them or open them as described below. The flow trim components 28 are preferably made of an erosion resistant hard material such as tungsten carbide or Stellite™.

The main bore 26 is formed to be larger in diameter than the outlet bore 22 in order to house, seat and seal the flow trim components 28 therein. A cylindrical seat 41 is positioned at the lower end of the main bore 26, and sealed to the valve body 12 in the main bore 26 with seat seal 42. The stationary cage 32 is held at its lower end within the inner diameter of the seat 41, and carries a cage seal 44 at its lower end to seal to the valve body 12. A seat inert member 46 is seated in the inside diameter of seat 41. This seat insert member 46 is preferably formed of erosion resistant material such as tungsten carbide and serves multiple purposes. The seat insert member 46 protrudes inwardly to the cage 32 above a widened retaining shoulder 48 of the cage 32, thereby retaining the cage 32 within the main bore 26. As well, the seat insert member 46 forms a seat for the flow collar 36, when the flow collar 36 is in the fully closed position covering the main and secondary flow ports 34, 35. A retaining sleeve 50 is preferably positioned in the main bore 26 between the seat 41 and the stem/bonnet assembly 40. The flow trim 28 is positioned within the retaining sleeve 50. The retaining sleeve 50 extends transversely over the inlet bore 18, and has its bore 54 aligned with the outlet axis 24. The sleeve 50 includes at least one sleeve side port 52 into the sleeve bore 54, the side port 52 preferably being aligned with the inlet bore. In alternate embodiments, the sleeve side port 52 and main flow ports 34 may be offset relative to the inlet bore 18 for fracture prevention from debris moving down the inlet, as is described in US Patent Publication No. 2006/0163517.

The stem/bonnet assembly 40 is shown to include a stationary bonnet member 56 extending into the main bore 26, and carrying bonnet-body seal 58. Housed within the bonnet member 56 is threaded stem member 60. The stem 60 and bonnet 56 are sealed though stem-bonnet seal 62 and stem bushing 64. The stem 60 is designed for axial movement, the result of rotational movement of the upper stem nut 68 on the threaded section of the stem 60, initiated for example by rotating the handle 66 at its upper end. The stem 60 is connected and sealed to the flow collar 36 at its lower end in a known manner to impart translational movement to the flow collar 36 for opening and closing the valve 10. Key member 65, positioned between the stem 60 and the bonnet 56, prevents rotational movement of stem 60 within the bonnet 56, while permitting translational movement to be imparted to the flow collar 36. The upward movement of the stem 60, and thus the flow collar 36, is limited when stem shoulder 70 hits the stem nut 68. Alternate stem stop mechanisms may be used to limit upward stem movement to prevent fully uncovering the main flow ports 34. The bonnet 56 is connected at its upper end to bonnet flange 72, which retains the bonnet 56 and closes the upper end of the main bore 26. The flange 72 is bolted to the valve body 12 through cap screws 74. Alternate mechanisms for closing the valve body 12, and for actuating the flow collar 36 for translational movement are well known in the art, such as hydraulic actuators.

In the embodiment of the invention illustrated in FIG. 2, at the full upward movement of the stem 60 (i.e., when the stem shoulder 60 hits the stem nut 68), the flow collar 36 still partially covers the upper part of the main flow ports 34 (i.e., the part most distant from the body outlet 16), preferably by leaving between about 5 and 15% of the main flow port diameter covered in the full open position. More preferably, the flow collar 36 leaves 8 to 12% of the flow port diameter covered, and most preferably, the flow collar 36 leaves 9 to 10% of the flow port diameter covered in the full open position. With the flow being throttled with an external flow collar 36 in this manner, the majority of the fluid flow from the body inlet 14 through the main flow ports 34 has been found to be directed angularly upwardly into the flow collar chamber 76 (defined by the bore of the cylindrical flow collar 36), and thus away from the body outlet 16 (or outlet bore 22). With this arrangement, it has been found that erosion is reduced to components located downstream of the cage 32 (i.e., proximate or downstream of the area marked at 78 in the Figures). It has also been found that erosion is reduced to the portion of the valve body located at the outlet of the main bore 26 into the outlet bore 22.

Without being bound by same, it is believed that this flow trim/main flow port arrangement of this invention has the effect of directing the vena contracta (i.e., flow restriction on exit from restriction of main flow ports) upwardly away from the body outlet in the fully open position. This is a more preferred situation as the fluid exiting the vena contracta is normally at a very high velocity, so the flow trim components, formed of hard materials such as tungsten carbide, can better manage this high velocity flow than can the valve body at the valve body outlet, which is made of less hard grades of carbon steel.

This is to be contrasted to the fluid management in the prior art arrangement of FIG. 1 where, in the full open position, with the main flow ports 34 fully uncovered, the fluid flow through the main flow ports 34 is directed parallel to the inlet axis 20 and perpendicular to the outlet axis 24 (see arrows to show this fluid flow through the main flow ports). This results in direct impingement of the fluid exiting the opposing main flow ports 34. There are two consequences of this prior art flow regime. Firstly, the hydrostatic restriction of the directly opposing fluid jets significantly reduces the overall valve capacity (Cv). Secondly, some of the fluid is directed downwardly toward the outlet area 78 in this turbulent regime, causing erosion at this portion of the valve outlet.

Thus, the choke valve 10 of FIG. 2, by drawing the turbulent flow upwardly into the flow collar chamber 76, has the dual advantage of reducing erosion at the outlet, and allowing for increased valve capacity (Cv). These advantages are not possible in choke valves of the internal plug design. While the internal plug may allow for the cage and port to be enlarged for higher valve capacities, the presence of the internal plug in the downstream portion of the cage bore blocks this part of the flow trim, preventing fluid flow from being pulled upwardly in the cage bore, away from the outlet. The flow collar design of the present invention presents an upstream flow collar chamber 76 within the bore of the flow collar 36, to allow for this upward movement of the turbulent flow, provided the flow collar 36 does not fully uncover the main flow ports 34 in its full open position.

While the valve as described above is seen to exemplify one means for limiting the movement of the flow collar (stop shoulder 70 on threaded stem 60) such that each of the main flow ports 34 remain partially covered by the flow collar 36 in the fully open position, the invention extends to alternate means for achieving this end. For instance, alternate stop mechanisms to limit the travel of the stem 60 and external flow collar 36 in the full open position may be incorporated.

Alternatively, the flow trim components 28 and/or the main flow ports 34 may be sized and/or oriented relative to each other in a manner such that:

i) the main flow ports are sized or located on the cage such that they each remain partially covered by the flow collar in the fully open position;

ii) the cage may be located relative to the external flow collar such that each of the main flow ports remain partially covered in the fully open position; and iii) the external flow collar may be sized or located relative to the cage and the main flow ports such that each of the main flow ports remain partially covered in the fully open position.

Although not shown, the invention may also include inwardly extending protuberances to deflect flow toward the main flow ports 34 of the cage 32, as described in US Patent Publication No. 2006/0163517 and U.S. Pat. No. 6,105,614.

While not shown in the present figures, the flow trim and stem/bonnet assembly of the present invention may be positioned as an insert assembly wherein the flow trim is held within a removable tubular cartridge in the main bore for sub sea applications, such as shown in prior art including US Patent Publication No. 2006/0163517 or U.S. Pat. No. 4,540,022.

EXAMPLE

In a test of the valve as shown in FIG. 2, in which the main flow ports had diameters of 0.625 inches, and the fluid flow included 2% sand to accelerate erosion over an 8 hour test period, operating with the flow collar positioned such that 3/16 inches of the main flow port diameter remained covered by the flow collar, wear of a wear sleeve inserted at the valve body outlet from the main bore was greatly reduced compared to a similar valve operated with the flow collar in the full open position in which the main flow ports having diameters of 0.500 inch were in a fully uncovered position. At these flow collar positions, the pressure drop across the two valves were the same. The wear sleeve in the valve of FIG. 2 had a weight reduction of 2.46%, while the wear sleeve in the prior art valve had a weight reduction of 8.10%. The valve capacity (Cv) for the valve of FIG. 2 was increased to 14, compared to a valve capacity (Cv) of 10 for the prior art valve, both being in their fully open positions. The fully open position for the test valve left 1/16 inches of the main flow port diameter covered by the flow collar.

All references mentioned in this specification are indicative of the level of skill in the art of this invention. All references are herein incorporated by reference in their entirety to the same extent as if each reference was specifically and individually indicated to be incorporated by reference. However, if any inconsistency arises between a cited reference and the present disclosure, the present disclosure takes precedence. Some references provided herein are incorporated by reference herein to provide details concerning the state of the art prior to the filing of this application, other references may be cited to provide additional or alternative device elements, additional or alternative materials, additional or alternative methods of analysis or application of the invention.

The terms and expressions used are, unless otherwise defined herein, used as terms of description and not limitation. There is no intention, in using such terms and expressions, of excluding equivalents of the features illustrated and described, it being recognized that the scope of the invention is defined and limited only by the claims which follow. Although the description herein contains many specifics, these should not be construed as limiting the scope of the invention, but as merely providing illustrations of some of the embodiments of the invention.

One of ordinary skill in the art will appreciate that elements and materials other than those specifically exemplified can be employed in the practice of the invention without resort to undue experimentation. All art-known functional equivalents, of any such elements and materials are intended to be included in this invention. The invention illustratively described herein suitably may be practiced in the absence of any element or elements, limitation or limitations which is not specifically disclosed herein.

The invention claimed is:

1. A valve having a fluid flow path extending therethrough which is to be restricted or closed, comprising:
    a hollow valve body assembly having an inlet bore and an outlet bore substantially at right angles and a main bore which is an extension of the outlet bore and which communicates with the inlet bore;
    a flow trim positioned in the main bore, the flow trim comprising a stationary, open-ended tubular cage and an external cylindrical flow collar slidable along the outer side wall of the cage, the external flow collar forming a bore and being closed at an upstream end to form a flow collar chamber in the bore of the external flow collar, the cage side wall forming an internal bore aligned with the outlet bore and at least a pair of diametrically opposed main flow ports, whereby fluid enters the valve through the inlet bore, passes through the main flow ports at reduced pressure and continues through the outlet bore;
    a bonnet disengagably connected with, and closing, an upper end of the valve body;
    a stem for biasing the external flow collar over the main flow ports; and
    the external flow collar being located within the main bore for limited movement between a fully closed position wherein each of the main flow ports is fully covered by the external flow collar and a fully open position wherein each of the main flow ports remains partially covered by the external flow collar with between about 5% and 15% of the diameter of each of the main flow ports at an upper part of the main flow ports remaining covered in the fully open position, such that fluid flow from the inlet bore through each of the main flow ports is directed angularly into the flow collar chamber of the external flow collar away from the outlet bore to reduce erosion at the outlet bore without reducing the flow capacity of the valve in the fully open position.

2. The valve of claim 1, wherein between about 8% and 12% of the diameter of each of the main flow ports remains covered by the external flow collar in the fully open position.

3. The valve of claim 1, wherein between about 9% and 10% of the diameter of each of the main flow ports remains covered by the external flow collar in the fully open position.

4. The valve of claim 1, wherein there are 1, 2 or 3 pairs of diametrically opposed main flow ports circumferentially spaced such that their midpoints are circumferentially aligned on the cage, and located such that they overlap an intersection of the centre axes of the inlet bore and the outlet bore.

5. The valve of claim 4, wherein there is one pair of diametrically opposed main flow ports.

6. The valve of claim 4, which further comprises a tubular sleeve positioned in the main bore across the inlet bore and forming at least one side port communicating with the inlet bore, the flow trim being positioned within the tubular sleeve, and wherein the bonnet closes the upper end of both the valve body and the tubular sleeve.

7. The valve of claim 6, wherein the at least one side port is aligned with the inlet bore, and wherein one pair of the diametrically opposed main flow ports has an axis through their midpoints that is parallel to the centre axis of the inlet bore.

8. The valve of claim 7, wherein:
the inlet bore and the outlet bore are arranged in a T-shape to provide a body side inlet, a body outlet and an insert chamber at the intersection of the body side inlet and the body outlet; and
the tubular sleeve and the flow trim are arranged as a removable insert assembly positioned in the insert chamber, the insert assembly comprising:
  i. a tubular cartridge having a side wall forming an internal bore and at least one side port communicating with the body side inlet, whereby fluid enters through the at least one side port from the body side inlet;
  ii. the flow trim positioned in the cartridge internal bore, the flow trim comprising the tubular cage aligned with the body outlet, and the external flow collar slidable along the outer side wall of the cage, the cage side wall forming the pair of diametrically opposed main flow ports located to overlap the intersection of the axes of the body side inlet and the body outlet, and aligned with the at least one side port of the tubular cartridge to communicate directly with the at least one side port, whereby fluid from the body side inlet may enter the cage bore at reduced pressure and pass through the body outlet;
  iii. the bonnet disengagably connected with, and closing, the upper end of the tubular cartridge and the body;
  iv. the stem for biasing the flow collar over the main flow ports; and
  v. the external flow collar being located within the tubular cartridge for limited movement between a fully closed position wherein each of the main flow ports is fully covered by the external flow collar and a fully open position wherein each of the main flow ports remains partially covered by the external flow collar with between about 5% and 15% of the diameter of each of the main flow ports at an upper part of the main flow ports remaining covered in the fully open position, such that fluid flow from the body side inlet through each of the main flow ports is directed angularly into the flow collar chamber of the external flow collar away from the body outlet to reduce erosion at the outlet bore without reducing the flow capacity of the valve in the fully open position.

9. The valve of claim 7, further comprising:
at least a pair of diametrically opposed secondary flow ports formed in the side wall of the cage, the secondary flow ports having a smaller diameter than that of the main flow ports and each pair of secondary flow ports being positioned with an axis which is offset by 90° from the axis of the main flow ports and closer to the body outlet than are the main flow ports.

10. The valve of claim 9, further comprising:
protuberances extending inwardly into the internal bore of the tubular sleeve or cartridge from the side wall of the tubular sleeve or cartridge and being aligned with one or both of the main and secondary flow ports, so that fluid moving through an annulus formed between the flow trim and the tubular sleeve or cartridge is deflected inwardly by the protuberances to enter the cage through main flow ports.

11. The valve of claim 9, comprising only one pair of main flow ports sized to accommodate at least about 80% of the fluid flow from the inlet, and only one pair of secondary flow ports.

12. The valve of claim 1 wherein, to limit the movement of the external flow collar such that each of the main flow ports remains partially covered by the flow collar in the fully open position, the valve includes one or more of the following arrangements:
  i) each of the main flow ports being located or sized on the cage such that each of the main flow ports remains partially covered by the flow collar in the fully open position;
  ii) the cage being located relative to the external flow collar such that each of the main flow ports remains partially covered in the fully open position;
  iii) the external flow collar being located or sized relative to the cage and each of the main flow ports such that each of the main flow ports remains partially covered in the fully open position; and
  iv) a stop mechanism to limit the travel of the stem and the external flow collar such that each of the main flow ports remains partially covered in the fully open position.

13. The flow trim of claim 12.

14. A method of reducing erosion in a valve having a fluid flow path extending therethrough which is to be restricted or closed, the valve being of the type which comprises a hollow valve body assembly with an inlet bore and an outlet bore substantially at right angles and a main bore which is an extension of the outlet bore and which communicates with the inlet bore; a flow trim positioned in the main bore, the flow trim providing a stationary tubular cage and an external flow collar slidable along the side wall of the cage, the cage side wall forming an internal bore aligned with the outlet bore and at least a pair of diametrically opposed main flow ports, whereby fluid enters the valve through the inlet bore, passes through the main flow ports at reduced pressure, and continues through the outlet bore; a bonnet disengagably connected with, and closing, an upper end of the valve body; and a stem for biasing the external sleeve over the main flow ports, the method comprising:
configuring the flow trim such that the tubular cage is open-ended and the external flow collar slides along the outer side wall at an upstream end of the tubular cage, the external flow collar forming a bore and being closed at its upstream end to form a flow collar chamber in the bore of the external flow collar; and
locating the external flow collar within the main bore for limited movement between a fully closed position wherein each of the main flow ports is fully covered by the external flow collar and a fully open position wherein each of the main flow ports remains partially covered by the external flow collar with between about 5% and 15% of the diameter of each of the main flow ports at an upper part of the main flow ports remaining covered in the fully open position, such that fluid flow from the inlet bore through each of the main flow ports is directed angularly into the flow collar chamber of the external flow collar away from the outlet bore to reduce erosion at the outlet bore without reducing the flow capacity of the valve in the fully open position.

* * * * *